US009482082B2

(12) United States Patent
Zemach et al.

(10) Patent No.: US 9,482,082 B2
(45) Date of Patent: Nov. 1, 2016

(54) METHOD AND APPARATUS FOR STIMULATING A GEOTHERMAL WELL

(71) Applicants: Ezra Zemach, Reno, NV (US); Paul Spielman, Reno, NV (US)

(72) Inventors: Ezra Zemach, Reno, NV (US); Paul Spielman, Reno, NV (US)

(73) Assignee: ORMAT TECHNOLOGIES Inc., Reno, NV (US)

( * ) Notice: Subject to any disclaimer, the term of this patent is extended or adjusted under 35 U.S.C. 154(b) by 608 days.

(21) Appl. No.: 13/839,829

(22) Filed: Mar. 15, 2013

(65) Prior Publication Data
US 2014/0262256 A1    Sep. 18, 2014

(51) Int. Cl.
E21B 33/12    (2006.01)
E21B 43/26    (2006.01)
E21B 33/124   (2006.01)
F24J 3/08     (2006.01)

(52) U.S. Cl.
CPC .......... *E21B 43/261* (2013.01); *E21B 33/124* (2013.01); *F24J 3/085* (2013.01); *Y02E 10/14* (2013.01)

(58) Field of Classification Search
CPC .... E21B 43/261; E21B 33/124; E21B 23/06; E21B 43/2405; E21B 43/247; E21B 43/162; F24J 3/085
USPC ............ 166/272.2, 387, 383, 266, 268, 126
See application file for complete search history.

(56) References Cited

U.S. PATENT DOCUMENTS 5,417,288 A * 5/1995 Melenyzer ............... E21B 43/10
                                                166/208
5,661,977 A * 9/1997 Shnell ..................... E21B 36/00
                                                422/212
2010/0000736 A1* 1/2010 Bour ..................... E21B 33/124
                                                166/281
2010/0314134 A1* 12/2010 Nutley .................... C08L 23/16
                                                166/387
2010/0326649 A1* 12/2010 Spacey ................... E21B 41/00
                                                166/179
2011/0061875 A1* 3/2011 Tips ........................ E21B 33/14
                                                166/373
2011/0253393 A1* 10/2011 Vaidya ................ E21B 33/1208
                                                166/387
2012/0312560 A1* 12/2012 Bahr ................... E21B 33/1208
                                                166/387
2013/0062066 A1* 3/2013 Broussard ............... E21B 34/06
                                                166/305.1
2013/0123394 A1* 5/2013 Breach ................... C09K 5/508
                                                524/25
2015/0315898 A1* 11/2015 Marland ................. E21B 33/14
                                                166/250.14

OTHER PUBLICATIONS

S.K. Sanyal et al., "Injection Testing for an Enhanced Geothermal System Project at Desert Peak, Nevada", Geothermal Resources Council Transactions, vol. 27, pp. 885-891. Oct. 12-15, 2003.
International Search Report and Written Opinion issued Aug. 27, 2014, in PCT/IB 14/00296, filed Mar. 12, 2014.

(Continued)

*Primary Examiner* — Michael Wills, III
(74) *Attorney, Agent, or Firm* — Oblon, McClelland, Maier & Neustadt, L.L.P.

(57) ABSTRACT

A method for stimulating a sub-commercial geothermal well includes steps of drilling a stimulating well; isolating a corresponding zone in the stimulating well using vertically spaced swell packers that are swellable when contacted by subterraneously heated geothermal brine present in the stimulating well and are resistant to the high temperature of the brine; injecting stimulating fluid into the stimulating well such that it will flow only through a zone of the well that is not isolated; and allowing the stimulating fluid to exit the well from a non-isolated zone located at a desired depth into a surrounding geological formation. The fracture or system of fractures within the formation is thereby hydraulically reopened.

18 Claims, 7 Drawing Sheets

(56) References Cited

OTHER PUBLICATIONS

Schochet et al, "A Step Toward EGS Commercialization in the Basin and Range at Desert Peak East, Nevada", Geothermal Resources Council Transactions vol. 26, Sep. 22-25, 2002. pp. 251-255.
Lutz et al, "Geologic Characterization of Pre-Tertiary Rocks at the Desert Peak East EGS Project Site, Churchill County, Nevada", Geothermal Resources Council Transactions vol. 27, Oct. 12-15, 2003. pp. 865-871.
Robertson-Tait et al, Progress and Future Plans at the Desert Peak East EGS Project, Geothermal Resources Council Transactions vol. 27, Oct. 12-15, 2003. pp. 871-878.
Lutz et al, "Stratigraphic Relationships in Mesozoic Basement Rocks At The Desert Peak East EGS Area, Nevada", Twenty-Ninth Workshop on Geothermal Reservoir Engineering Stanford University, Stanford, California, Jan. 26-28, 2004, pp. 1-9.
Robertson-Tait et al, "Selection of an Interval for Massive Hydraulic Stimulation in Well DP-23-1, Desert Peak East EGS Project, Nevada", Twenty-Ninth Workshop on Geothermal Reservoir Engineering Stanford University, Stanford, California, Jan. 26-28, 2004, pp. 1-6.
Carlson et al, "Fracture Permeability Evolution in Rock from the Desert Peak EGS Site", Geothermal Resources Council Transaction, vol. 28, Aug. 29-Sep. 1, 2004. pp. 279-285.
Kratt et al, "Spectral Analyses of Well Cuttings from Drillhole DP23-1, Desert Peak EGS Area, Nevada-Preliminary Study of Minerals and Lithologies by Infrared Spectrometry", Geothermal Resources Council Transaction, vol. 28, Aug. 29-Sep. 1, 2004. pp. 473-477.
Robertson-Tait et al, "The Desert Peak East EGS Project: A Progress Report", World Geothermal Congress 2005, Antalya, Turkey, Apr. 24-29, 2005, pp. 1-7.
Robertson-Tait et al, "Progress on the Desert Peak East EGS Project", GRC Transactions, vol. 29, 2005, pp. 117-124.
Lutz et al, "Geological and Structural Relationships in the Desert Peak Geothermal System, Nevada, Implications for EGS Development", Thirty-Fourth Workshop on Geothermal Reservoir Engineering Stanford University, Stanford, California, Feb. 9-11, 2009, pp. 1-10.
Kovac et al, Borehole Image Analysis and Geological Interpretation of Selected Features in Well DP 27-15 at Desert Peak, Nevada: Pre-Stimulation Evaluation of an Enhanced Geothermal System, Thirty-Fourth Workshop on Geothermal Reservoir Engineering Stanford University, Stanford, California, Feb. 9-11, 2009, pp. 1-8.
Davatzes et al. "Fractures, Stress and Fluid Flow Prior to Stimulation of Well 27-15, Desert Peak, Nevada, EGS Project", Thirty-Fourth Workshop on Geothermal Reservoir Engineering Stanford University, Stanford, California, Feb. 9-11, 2009, pp. 1-11.
Rose et al, "Tracer Testing at the Desert Peak EGS Project", GRC Transactions, vol. 33, 2009, pp. 241-245.
Hickman et al. In-Situ Stress and Fracture Characterization For Planning of an EGS Stimulation in the Desert Peak Geothermal Field, Nevada, Thirty-Fifth Workshop on Geothermal Reservoir Engineering Stanford University, Stanford, California, Feb. 1-3, 2010, pp. 1-13.
Zemach et al, Feasibility Evaluation of an "In-Field", EGS Project at Desert Peak, Nevada, USA, World Geothermal Congress 2010, Bali, Indonesia, Apr. 25-29, 2010, pp. 1-10.
Chabora et al, "Hydraulic Stimulation of Well 27-15, Desert Peak Geothermal Field, Nevada, USA", Thirty-Seventh Workshop on Geothermal Reservoir Engineering Stanford University, Stanford, California, Jan. 30-Feb. 1, 2012. pp. 1-12.
Stacey et al. "EGS Stimulation of Well 27-15, Desert Peak Geothermal Field, Nevada", GRC Transactions. vol. 34, 2010. pp. 451-456.

* cited by examiner

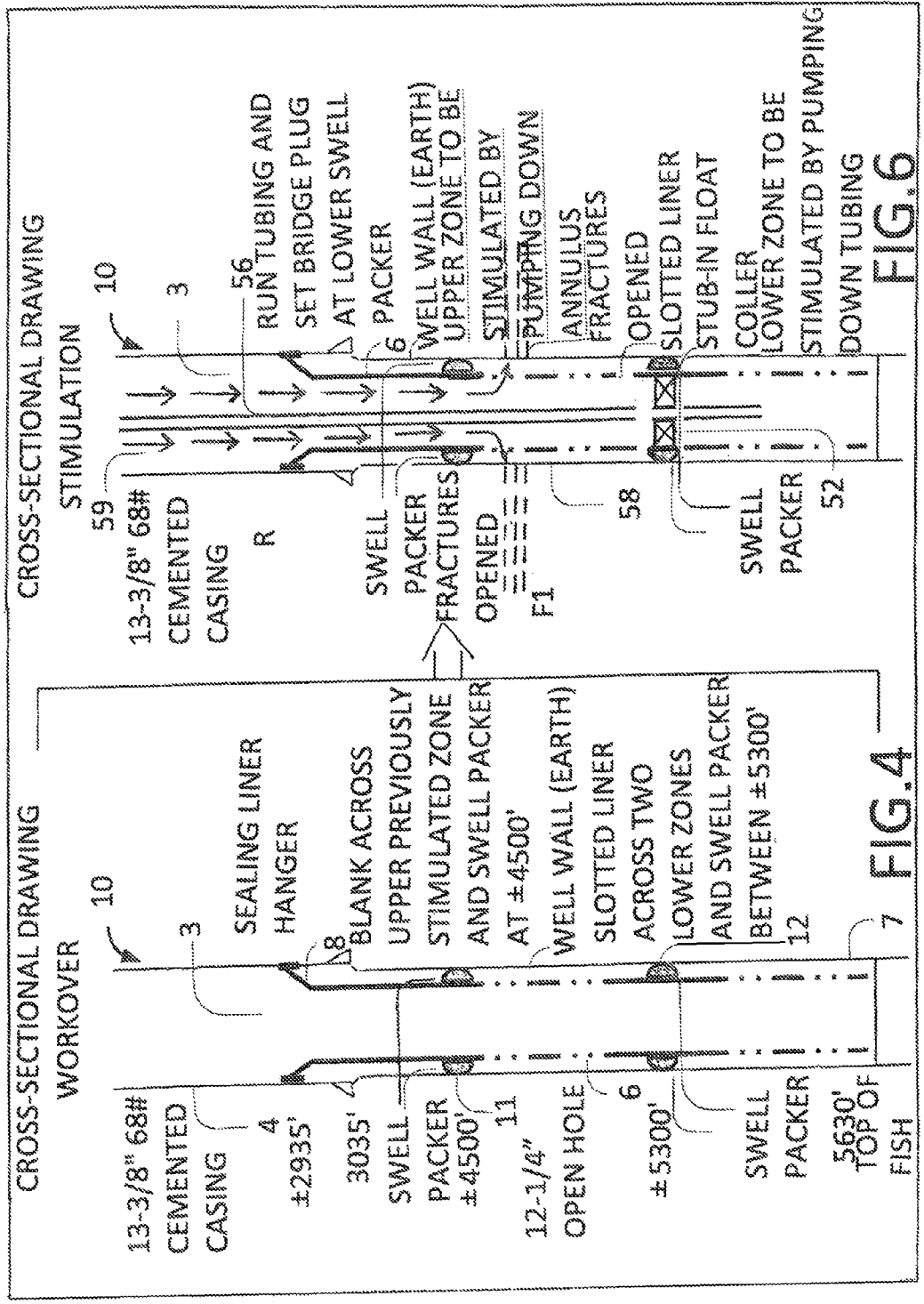

METHOD AND APPARATUS FOR STIMULATING A GEOTHERMAL WELL

FIELD

The present invention relates to the field of geothermal energy. More particularly, the invention relates to a method and apparatus for stimulating a geothermal well.

BACKGROUND

In geothermal power plants, hot fluid from a geothermal resource is extracted via a production well from underground to the ground surface. The extracted hot fluid is used for power production either directly when converted to steam and expanded in a turbine, or indirectly by means of a binary cycle power plant whereby the extracted hot fluid is brought in heat exchanger relation with the motive fluid of the power plant, such as an organic motive fluid. The heat depleted geothermal liquid is returned underground via an injection well, which is separated from the production well. The injected geothermal liquid becomes reheated and makes its way back to the production well.

As a result of continuous exploitation of the geothermal resource, the enthalpy of the extracted fluid and/or pressure tends to decrease over the course of time, reducing the economic viability of a power plant for producing power from the extracted geothermal resource. It would therefore be desirable to provide a method for enhancing a production well or injection well drilled in or adjacent to a field containing a depleted geothermal resource.

US 2012/0181034 discloses a method for stimulating an underground reservoir formation by introducing a particulate diverting agent into a well, to thereby temporarily seal passages within a fracture near the wellbore face and to isolate the fracture from the well. When a stimulation fluid is applied to the well at a sufficient pressure, an additional fracture is produced by hydroshearing such that it is expanded under shear. Rather than causing permanent damage to the permeability of the fractures which will lead to a reduction in economic value of the geothermal resource, the particulate diverting agent is able to degrade over an extended time. One disadvantage of this stimulation method is that it is a one-time operation due to the degradation of the diverting agent.

Another drawback of this stimulation method relates to its unpredictability. At times, a fracture will be produced at that unknown subterranean region which is not necessarily to best depth for use in such a developed well.

It is an object of the present invention to provide a method for stimulating a geothermal well by reopening a fracture extending thereto within a rock formation at a selected depth.

It is an additional object of the present invention to provide a method for stimulating a geothermal well that is repeatable for a plurality of stimulation operations.

It is a further object of the present invention to advantageously provide a method for stimulating an injection/production wells so that the amount of power that can be generated from the geothermal fluid can be increased.

Other objects and advantages of the invention will become apparent as the description proceeds.

SUMMARY

The present invention provides a method for stimulating a sub-commercial geothermal well, comprising the steps of drilling a stimulating well; isolating a corresponding zone in said stimulating well by means of a plurality of vertically spaced swell packers that are swellable when contacted by subterraneously heated geothermal brine present in said stimulating well and are resistant to the high temperature of said brine; injecting stimulating fluid into said stimulating well such that it will flow only through a zone of said well that is not isolated; and allowing said stimulating fluid to exit said well from a non-isolated zone located at a desired depth into a surrounding geological formation in order to hydraulically reopen a fracture or a system of fractures within said formation at said desired depth that will be connected with said existing well to be stimulated.

In one aspect, said a stimulating well is located within a field containing a geothermal resource and an existing sub-commercial well.

In one aspect, said a stimulating well is located adjacent a field containing a geothermal resource.

In one aspect, the corresponding zone of the stimulating well becomes isolated by mounting the plurality of vertically spaced swell packers to an outer face of a perforated liner, attaching said liner to a casing of the stimulating well while the plurality of swell packers are separated from a face of the stimulating well, and allowing the plurality of swell packers to swell when contacted by the subterraneously heated brine and to thereby seal a radial interspace between said well face and said outer face of said liner.

In one aspect, the corresponding zone of the stimulating well also becomes isolated by lowering a cement float collar to a depth of a lowermost swell packer into the simulating well and causing said stub-in float collar to become bonded with an inner face of the liner at the depth of said lowermost swell packer. The Stub-in float collar and Tag-in adapter prevent downward flow of the injected stimulating fluid, whereby to urge the stimulating fluid to exit the stimulating well via the perforations of the liner which are located within an inter-packer zone between two adjacent swell packers.

In one aspect, a downwardly extending injection tube and the Tag-in adapter is embedded within, and passes through a bottom face of the float collar. The stimulating fluid is injected within the injection tube, whereby to urge the stimulating fluid to exit the stimulating well via the perforations of the liner which are located within a toe zone between the lowermost swell packer and a well bottom.

In one aspect, the temperature for which each of the plurality of swell packers is resistant ranges from about 180° F. to about 420° F.

The present invention is also directed to apparatus for stimulating a sub-commercial geothermal well, comprising a perforated liner attachable to a casing of a stimulating well drilled within a field containing a geothermal resource and an existing sub-commercial well, a plurality of vertically spaced swell packers mounted to an outer face of said liner, and a Stub-in float collar bonded with an inner face of said liner at a depth of a lowermost swell packer, wherein each of said plurality of swell packers is swellable when contacted by subterraneously heated geothermal brine present in said stimulating well to isolate a corresponding zone in said stimulating well and is resistant to the temperature of said brine, stimulating fluid injectable into said stimulating well thereby being caused to exit said stimulating well from a non-isolated zone located at a desired depth into a surrounding geological formation in order to hydraulically stimulate a fracture or a system of fractures within said formation at said desired depth that will be connected with said existing well to be stimulated.

BRIEF DESCRIPTION OF THE DRAWINGS

In the drawings:

FIG. 4 is a vertical cross sectional view of a stimulating well according one embodiment of the present invention, through which stimulation fluid is injectable;

FIG. 6 is a vertical cross sectional view of the stimulating well of FIG. 4, showing one method, according to an embodiment of the present invention, for injecting stimulating fluid therethrough in order to hydraulically produce a fracture at a selected depth of a subterranean region.

DETAILED DESCRIPTION OF PREFERRED EMBODIMENTS

The present invention provides a novel method for stimulating a geothermal well which can lead to an increase in the amount of power that can be generated by fluid extracted from a field containing a geothermal resource. In such cases, the geothermal resource is generally in the form of a reservoir containing hot water and steam trapped within permeable and porous rocks under a layer of impermeable rock. Over the course of time, the output of a production well supplying the geothermal fluid to be extracted tends to decline, due to depletion of the resource or clogging of a fracture extending to the production well. In order to increase the output of the production well, a new well is then drilled within the field at a location which is relatively close to the resource. The newly drilled well (hereinafter the "stimulating well") is caused to be partially isolated, so that stimulation fluid injected through the well will flow only through a zone that is not isolated to hydraulically produce a fracture or stimulate an existing fracture at a desired depth. The newly produced or stimulated fracture may extend from the stimulating well to the geothermal reservoir, enabling additional geothermal fluid to be in fluid communication with the production well and to thereby increase output of the production well.

Figure 1:
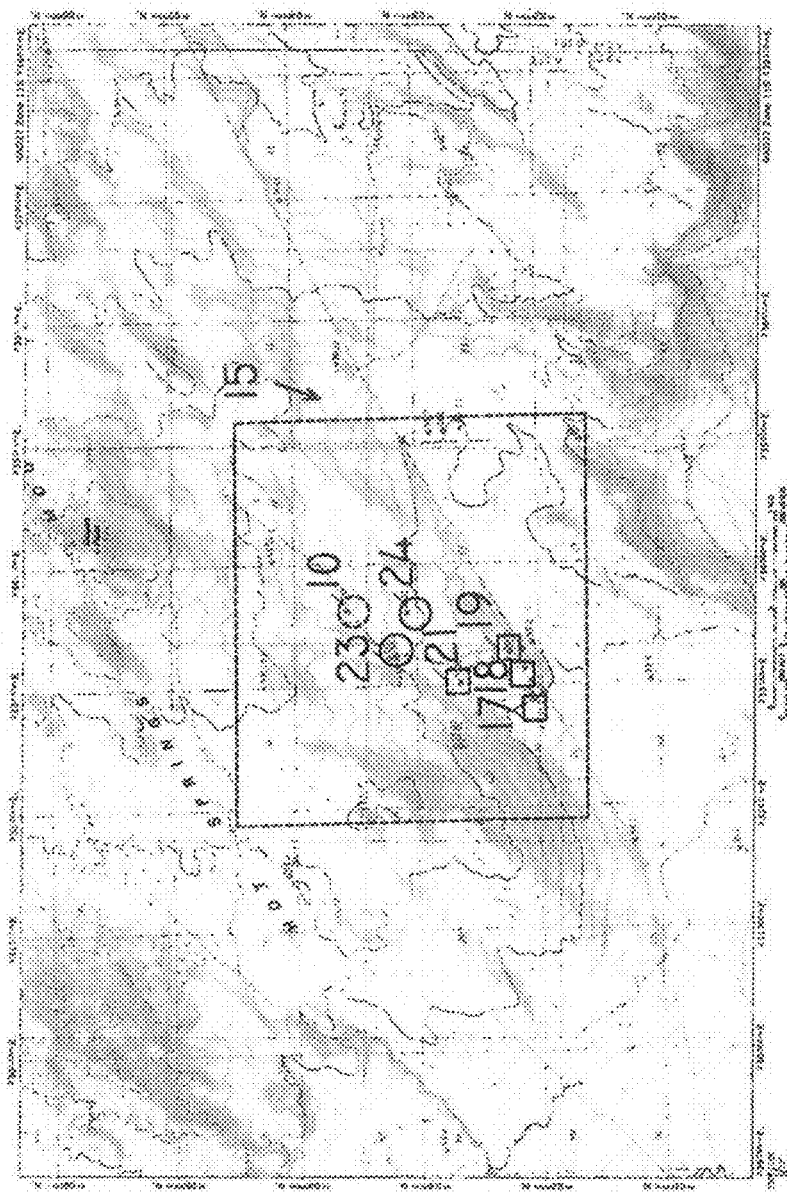
FIG. 1 is a schematic plan view of a field containing a geothermal resource, illustrating an example of the relative location of a stimulating well for inducing or opening a fracture in an adjoining rock formation.

As shown in FIG. 1, the location of a stimulating well 10 through which stimulation fluid is injectable is advantageously carefully selected within field 15 containing a geothermal resource and advantageously also a geothermal power plant so as to be relatively close to the resource. In such a manner, when a fracture is induced by the stimulating fluid, a hydrological connection is made between the fracture and a subterranean permeable region not intersected by well 10, facilitating an increase in the amount of fluid that can be reinjected into field 15, an increase in the amount of geothermal fluid extractable by a production well. Consequently, thereby an increase in the amount of electricity produced by the existing power plant will be achieved.

Prior to injecting fluid into stimulating well 10, a set of geological, geophysical and geomechanical surveys are made of field 15 to determine at which depth or depths are located the highest density of old natural fractures. The stimulating fluid is then delivered within well 10 to the selected depth, as will described hereinafter, in order to open a fracture at the selected depth.

Figure 2:
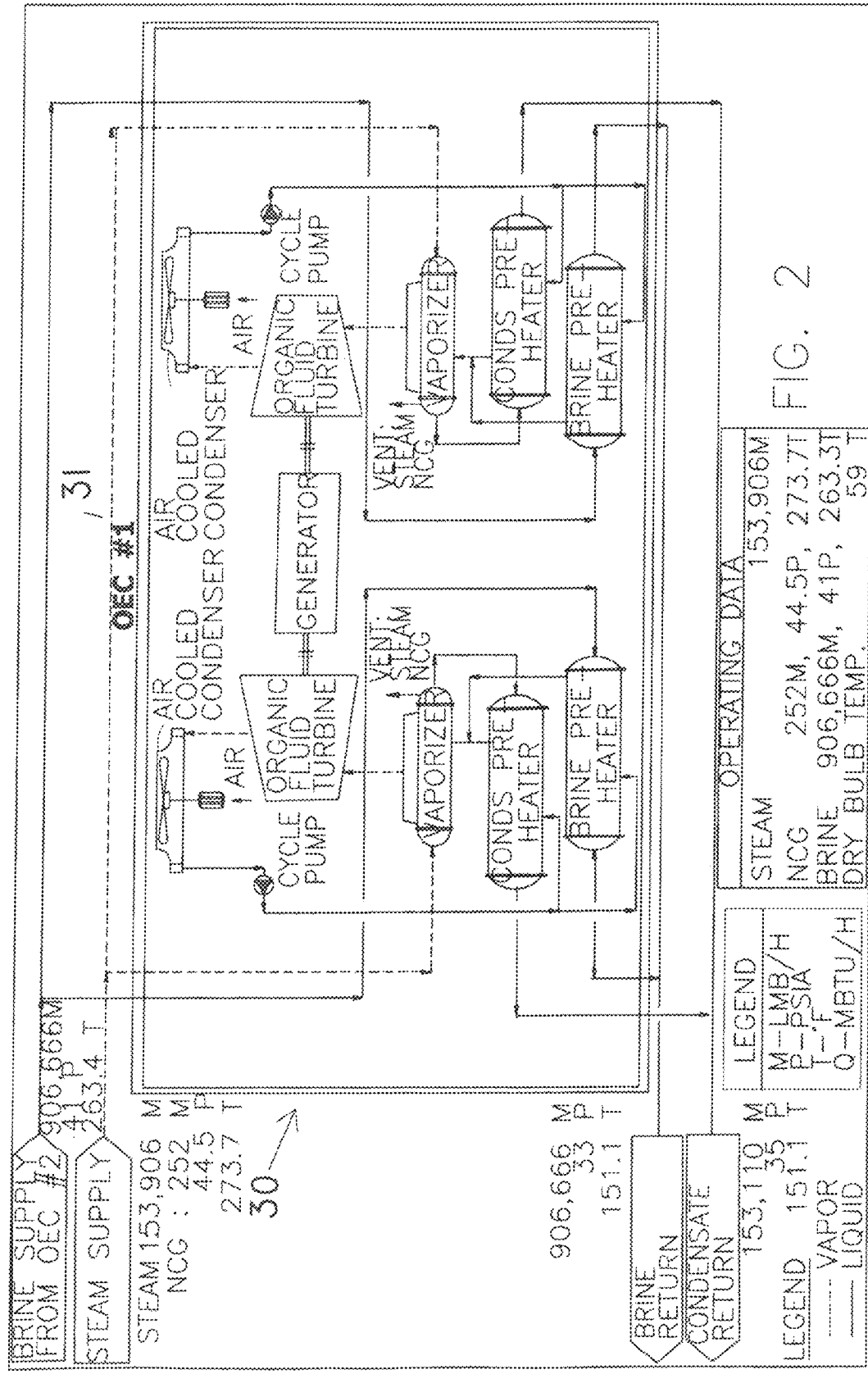
FIGS. 2 and 3 are schematic illustrations of two units, respectively, of an exemplary geothermal power plant, the power output of which can be significantly increased by stimulating a well.
Figure 3:
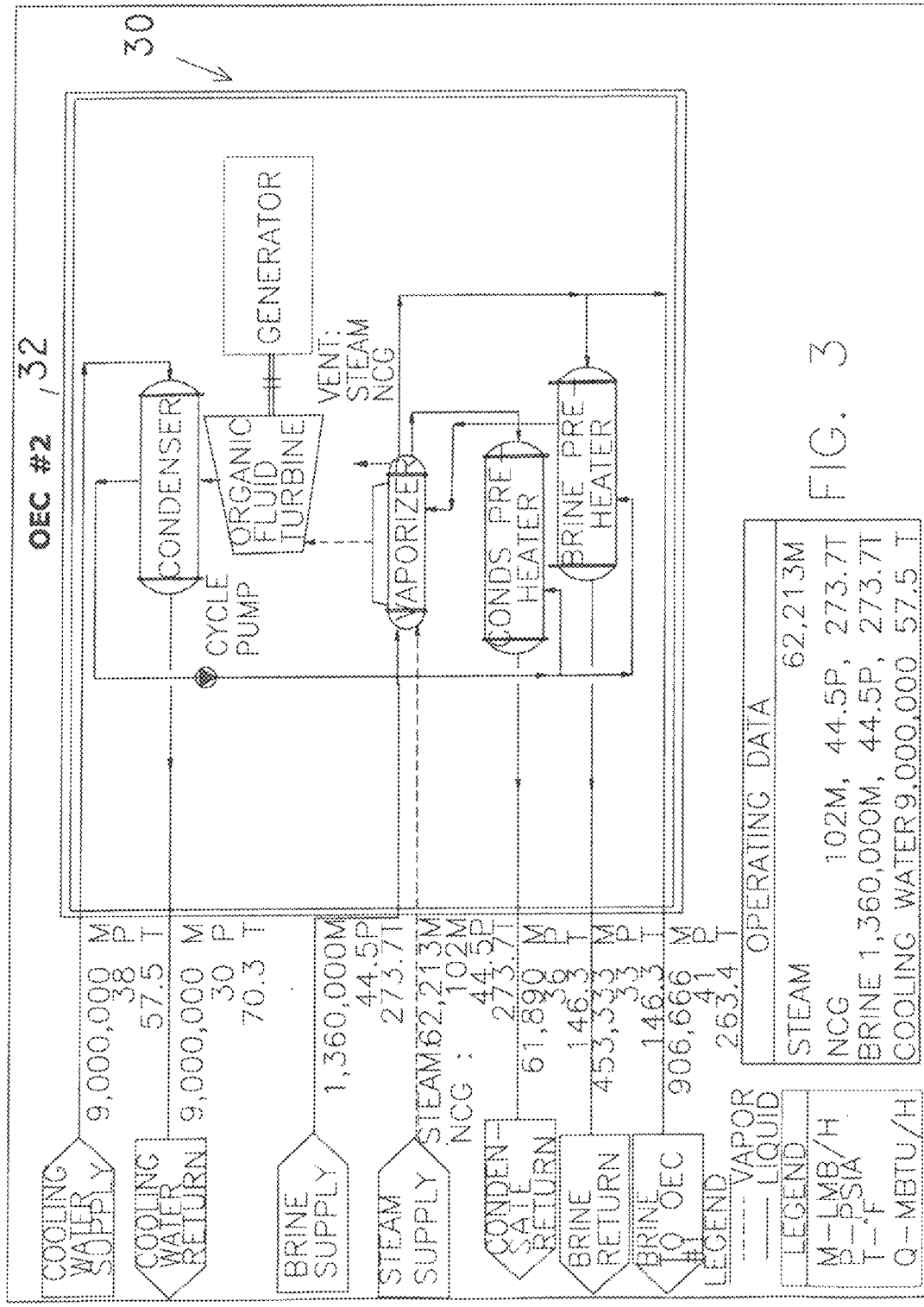

In the exemplary field 15 located at the Desert Peak geothermal reservoir, Nevada, USA, four artesian production wells, three of which, 17-19, are shown for producing two-phase geothermal fluid containing steam and liquid, three pumped production wells, one of which, 21 is shown for producing geothermal brine, and injection wells 23-24 have been in use for producing power by e.g. means of binary cycle power plant 30 shown in FIGS. 2 and 3 comprising advantageously geothermal energy conversion units 31 and 32. The outlet of production wells 17-19 and 21 are in fluid communication with two flash separators, to ensure that the separated geothermal steam and liquid are suitably delivered to the power plant. Stimulating well 10 is drilled in the vicinity of injection wells 23-24 so that the induced or reopened fracture will be connected to the existing geothermal resource so that geothermal fluid flows to fractures through which geothermal fluid is flowable to one or more of the production wells. By drilling simulating well 10 through which geothermal fluid is injectable, the total power capacity of power plant 30 can be considerably increased, for example from about 13 MW gross to about 15 MW gross.

It will be appreciated that the stimulating well can also be a production well. After a fracture is induced or opened thereby, the fracture will receive geothermal fluid from an injection well or from another fracture.

FIG. 4 illustrates a cross sectional view of a stimulating well 10 through which stimulation fluid is injectable according to one embodiment of the present invention. Wellbore 3 is formed by using a drill bit that is lowered at a lower end of a drill string. After a predetermined depth is drilled, the drill string and bit are removed, and the earthen well face at that depth is then lined with casing 4, which is cemented to the upper well face. This procedure is repeated until well bottom 9 is drilled to a desired depth. The lower earthen well face 7 below the lowermost casing 4 is formed with a smaller diameter than the inner diameter of the lowermost casing, e.g. the inner diameter of the lowermost casing is 13⅜" while that of the lower earthen well face is 12¼".

A cylindrical slotted steel liner 6 for preventing solid material from entering wellbore 3 while permitting fluid from exiting the wellbore is lowered into the well and is attached to the lowermost casing 4 by means of an oblique and outwardly extending sealing liner hanger 8. Before liner 6 is lowered into the well, two vertically spaced, annular swell packers 11 and 12 are attached to the outer face of the liner. Liner 6 extends downwardly to substantially the edge of well bottom 9. When liner 6 contacts well bottom 9, the latter may apply a reactive force to ensure liner immobilization.

Rubber swell packers 11 and 12 have elastomeric polymer sealing elements that are adapted to swell to about twice their size, when exposed to the high temperature of geothermal brine, generally ranging from about 180° F. to 500° F.

Prior art swell packers, for example those that are used in the oil and gas well industry, which are resistant to high pressures but not to high temperatures characteristic of geothermal brine, in contrast tend to burst or otherwise deteriorate when exposed to the high temperature of geothermal brine or characteristic of geothermal brines.

Swell packers 11 and 12 are made of a material that is resistant to the high temperatures of the brine. In one embodiment, the material of the swell packer is selected to swell when exposed to the specific composition of brine found in the simulating well. In other embodiments, the swell packer is selected to swell when exposed to any one of a range of brine compositions. Swell packers 11 and 12 begin to swell 1-2 days after being exposed to the brine that is present in the well, thereby exerting a pressure on both liner 6 and well face 7. After a period of approximately 12 days, the swell packers develop a pressure which is sufficient to adequately seal and isolate the annulus between liner 6 and well face 7. Slotted liner 6 to which swell packers 11 and 12 are attached is sufficiently thick and rigid to resist deformation despite the pressure applied by the swell packers.

Note that this is the way, as shown in FIG. 4, the well will look like after the stimulation is done.

Figure 5B:
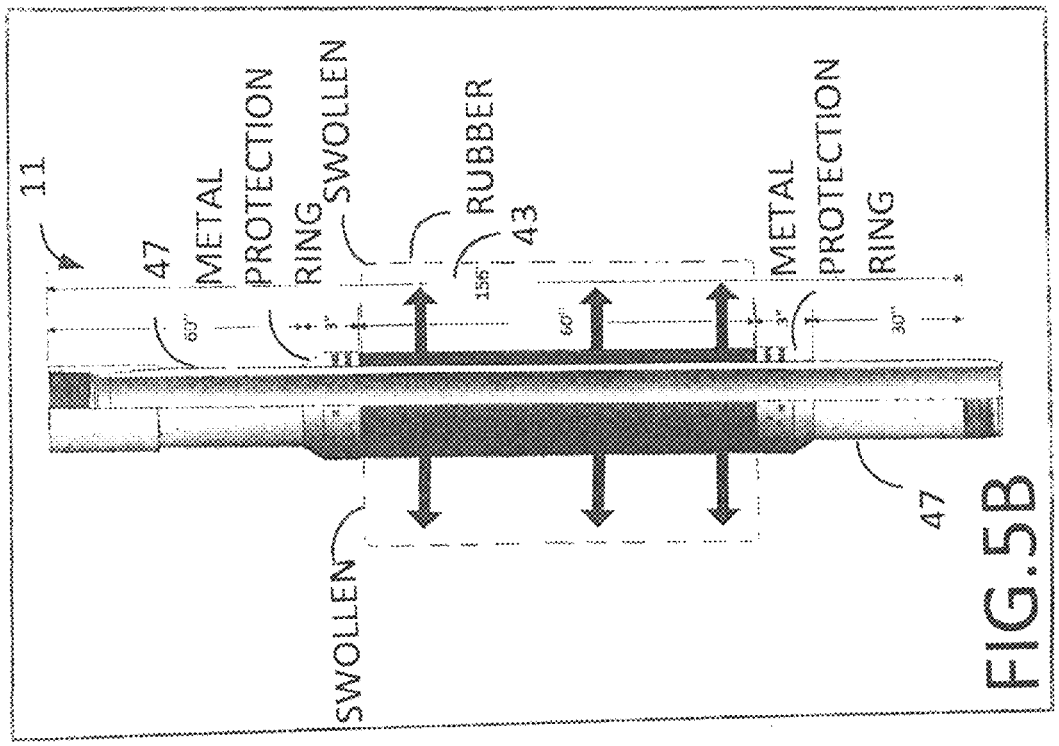
FIG. 5B is a front view of the swell packer of FIG. 5A, shown in a swollen state.
Figure 5A:
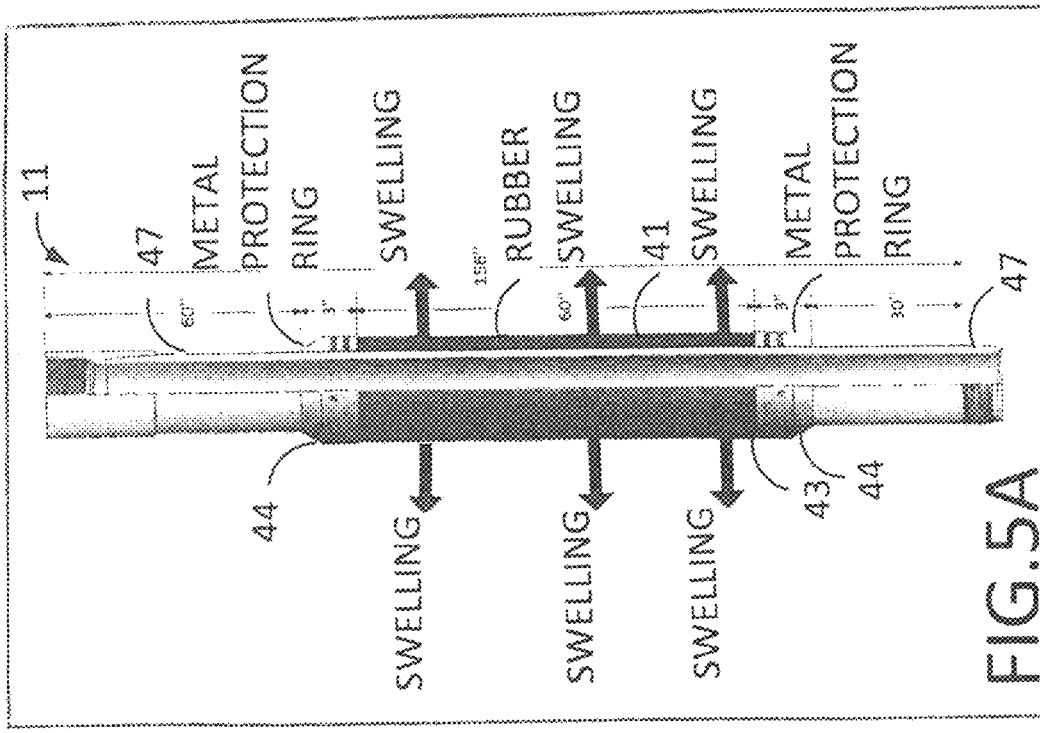
FIG. 5A is a front view of a swell packer according to one embodiment of the invention, shown in a non-swollen state.

FIGS. 5A-B illustrate an exemplary structure of a swell packer 11. Swell packer 11 is an elongated element having a central core 41 about which a tubular piece 43 of swellable rubber is mounted. A protection ring 44 having a diameter substantially equal to the unexpanded rubber piece 43 shown in FIG. 5A is provided at each longitudinal end of rubber piece 43 and is in abutting relation therewith, to prevent damage to the rubber and prevent longitudinal expansion. From each protection ring 44 longitudinally extends a corresponding attachment rod 47 of a significantly smaller diameter, for attachment to the slotted liner. As rubber piece 43 is not radially constricted, it is free to radially expand when in contact with geothermal brine. FIG. 5B schematically illustrates to what extent rubber piece 43 is expandable with respect to attachment rod 47. Rubber piece 43 retains a vertically straight annular profile when expanded and is of a sufficient long length to apply a sufficiently high wide area radial pressure onto the well face, which may be made of rough or fractured rock, in order to maintain a seal therewith when high pressure geothermal brine is injected into the stimulating well.

Figure 7:
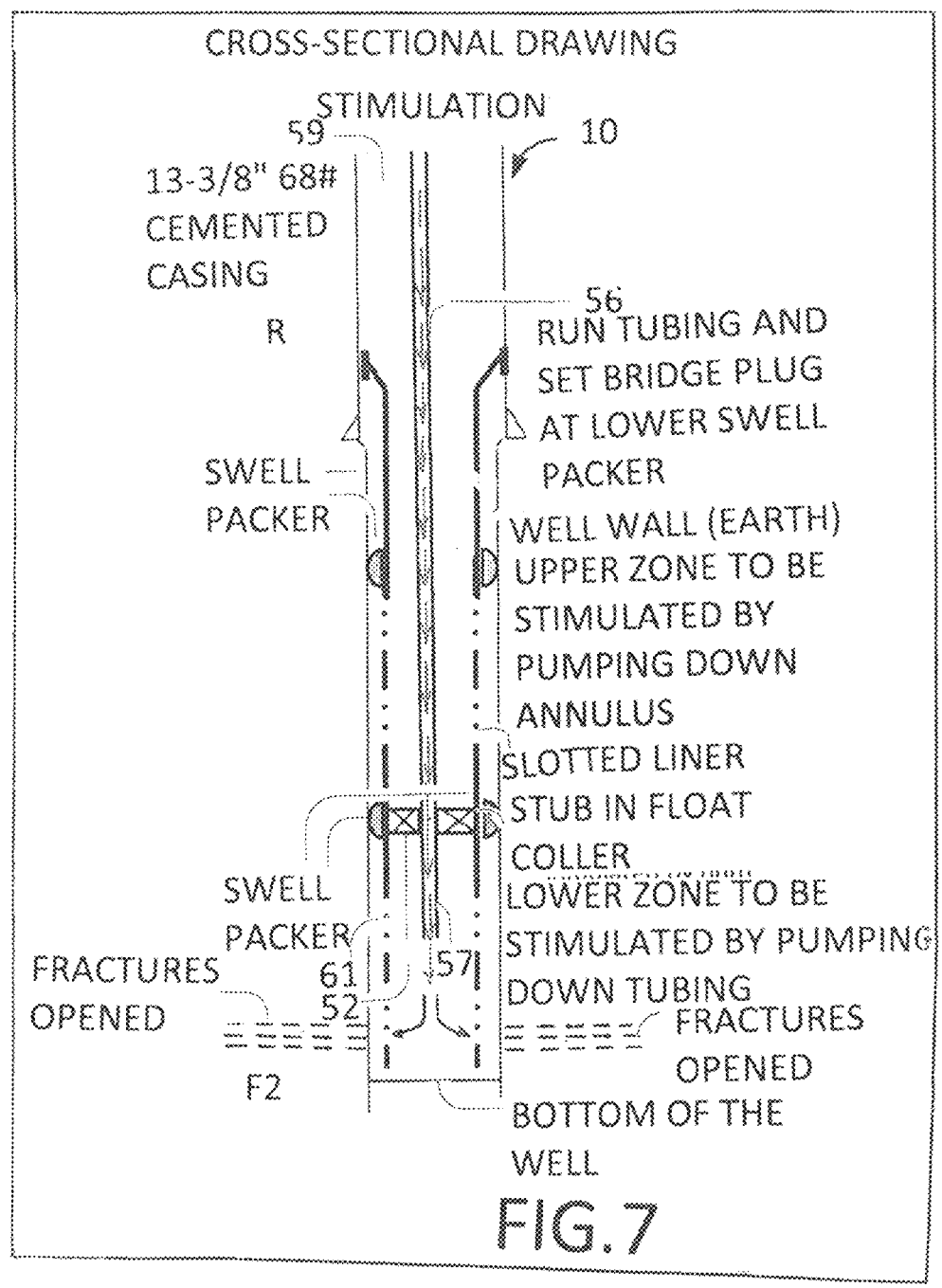
FIG. 7 is a vertical cross sectional view of the stimulating well of FIG. 4, showing another method, according to a further embodiment of the present invention, for injecting stimulating fluid therethrough in order to hydraulically produce a fracture at a different selected depth.

Referring now to FIGS. 6 and 7, a depth at which a fracture can be induced or opened can be selected by employing a bridge plug in the form of a Stub-in float collar 52 and injection tubing 56 embedded therewith. After slotted liner 6 has been set in position and the swell packers have been sufficiently expanded after being exposed to the geothermal brine present within well 10, Stub-in float collar 52 is lowered into wellbore 3 to the depth of the lowermost swell packer 12 and is bonded with the liner.

By virtue of float collar 52, the annular space between liner 6 and injection tubing 56 is sealed. When it is desired to induce or open a fracture F1 located at a relatively shallow depth of surrounding rock formation R, as shown in FIG. 6, the presence Stub-in float collar 52 in wellbore 3 prevents the downward passage of stimulating fluid 59 injected into wellbore 3, causing stimulating fluid 59 to exit well 10 via the slots of liner 6 located within the inter-packer zone 58. The stimulating fluid is injected at a sufficiently high pressure to produce fracture F1 in a subterranean region adjacent to inter-packer zone 58.

The injected stimulating fluid is preferably geothermal brine, e.g. geothermal brine discharged from a geothermal power plant, the use of which helps prevent depletion of the geothermal resource and ensures subterranean passage of geothermal brine back towards a production well for increased well output and resulting power production; however, it is envisioned that any other geologically compatible stimulating fluid such as high pressure water may also be used.

Alternatively or in addition, a relatively deep fracture F2 may be opened or induced by injecting stimulating fluid 59 through the interior of injection tubing 56, as shown in FIG. 7. Since injection tubing 56 passes through Stub-in float collar 52 having a Tag-in adapter, the stimulating fluid 59 discharged from the lower end 57 of injection tubing 56 is caused to exit well 10 via the slots of liner 6 located within toe zone 61 between lowermost packer 12 and well bottom 9. Once the stimulation has been completed, usually cement is drilled out.

At exemplary operating conditions when swell packers 11 and 12 of a length of 156 inches are positioned at a depth of about 4500 feet and 5300 feet, respectively, brine is injected at a rate of up to 36 BPM, whether into inter-packer zone 58 or into toe zone 61.

Figure 8:
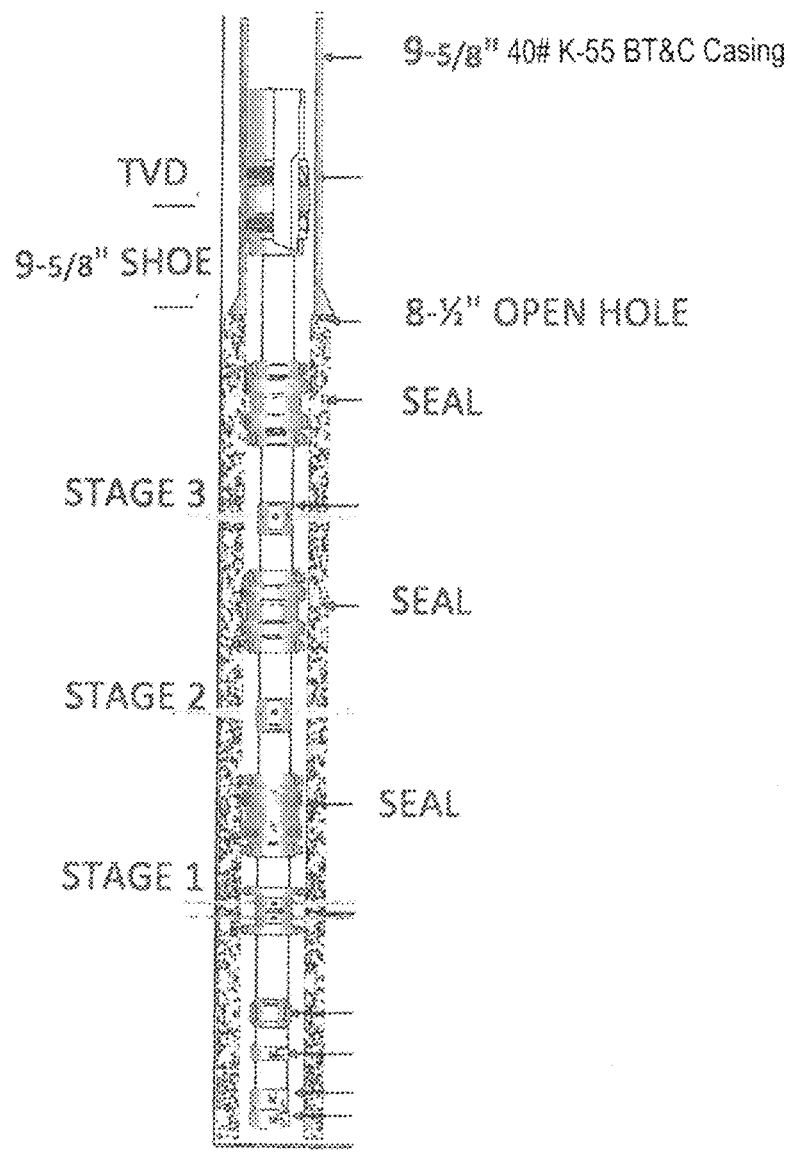
FIG. 8 is a front view of a mechanical packer according to one embodiment of the invention.

In addition, while the above description of the present invention and its embodiments refers to swell packers and there use in stimulating a geothermal well in the presence of high temperature geothermal brine, other packers can also be used in accordance with the present invention. E.g. mechanical packers can be used to isolate regions or levels in a stimulated geothermal well (see FIG. 8).

Furthermore, the Applicant would like to point that while the description refers to the present invention and its embodiments with relation to an existing geothermal resource, the present invention can be carried out also in environments where little or no geothermal resource is present. In such a case, geothermal brine or brine would have to be brought to the site of well stimulation.

While some embodiments of the invention have been described by way of illustration, it will be apparent that the invention can be carried out with many modifications, variations and adaptations, and with the use of numerous equivalents or alternative solutions that are within the scope of persons skilled in the art, without exceeding the scope of the claims.

The invention claimed is:

1. A method for stimulating an existing non-commercial geothermal well, comprising the steps of:
   drilling a stimulating well;
   isolating a corresponding zone in said stimulating well by means of a plurality of vertically spaced swell packers that are swellable when contacted by subterraneously heated geothermal brine present in said stimulating well and are resistant to the temperature of said brine;
   injecting stimulating fluid into said stimulating well such that it will flow only through another zone of said stimulating well that is not isolated; and
   allowing said stimulating fluid to exit said stimulating well from the non-isolated another zone located at a desired depth, into a surrounding geological formation in order to hydraulically produce a fracture or a system of fractures within said formation at said desired depth that will be connected with said existing well to be stimulated,
   wherein the step of isolating a corresponding zone in said stimulating well comprises:
   mounting the plurality of vertically spaced swell packers to an outer face of a perforated liner;
   attaching said liner to a casing of the stimulating well while the plurality of swell packers are separated from a face of the stimulating well; and allowing the plurality of swell packers to swell when contacted by the subterraneously heated brine and to thereby seal a radial interspace between said well face and said outer face of said liner.

2. The method according to claim 1 wherein said stimulating well is located within a field containing an aqueous geothermal resource and the existing non-commercial geothermal well.

3. The method according to claim 2, further comprising a step of attaching an oblique hanger outwardly extending from the outer liner face to the stimulating well casing.

4. The method according to claim 3, wherein the liner is supported by the bottom of the stimulating well.

5. The method according to claim 4, wherein a downwardly extending injection tube is embedded within a tag-in adapter and passes through the tag-in adapter.

6. The method according to claim 5, wherein the stimulating fluid is injected within the injection tube, whereby to urge the stimulating fluid to exit the stimulating well via the perforations of the liner which are located within a toe zone between the lowermost swell packer and a well bottom.

7. The method according to claim 2, wherein the liner extends from the casing to a bottom of the stimulating well.

8. The method according to claim 2, wherein the corresponding zone of the stimulating well also becomes isolated by lowering a stub-in float collar to a depth of a lowermost swell packer into the simulating well and causing said stub-in float collar to become bonded with an inner face of the liner at the depth of said lowermost swell packer.

9. The method according to claim 8, wherein the stub-in float collar prevents downward flow of the injected stimulating fluid, whereby to urge the stimulating fluid to exit the stimulating well via perforations of the liner which are located within an inter-packer zone between two adjacent swell packers.

10. The method according to claim 1, wherein the stimulating well is an injection well and the produced fracture or system of fractures constitutes an additional source of geothermal fluid supplied to the existing well which is a production well.

11. The method according to claim 1, wherein the stimulating well is a production well and the existing well is an injection well.

12. The method according to claim 1, wherein the stimulating fluid is pressurized geothermal brine.

13. A method for stimulating an existing non-commercial geothermal well, comprising the steps of:
drilling a stimulating well;
isolating a corresponding zone in said stimulating well by means of a plurality of vertically spaced swell packers that are swellable when contacted by subterraneously heated geothermal brine present in said stimulating well and are resistant to the temperature of said brine;
injecting stimulating fluid into said stimulating well such that it will flow only through another zone of said stimulating well that is not isolated; and
allowing said stimulating fluid to exit said stimulating well from the non-isolated another zone located at a desired depth into a surrounding geological formation in order to hydraulically produce a fracture or a system of fractures within said formation at said desired depth that will be connected with said existing well to be stimulated,
wherein the temperature for which each of the plurality of swell packers is resistant ranges from about 180° F. to about 420° F.

14. A method for stimulating an existing non-commercial geothermal well, comprising the steps of:
drilling a stimulating well;
isolating a corresponding zone in said stimulating well by means of a plurality of vertically spaced swell packers that are swellable when contacted by subterraneously heated geothermal brine present in said stimulating well and are resistant to the temperature of said brine;
injecting stimulating fluid into said stimulating well such that it will flow only through another zone of said stimulating well that is not isolated; and
allowing said stimulating fluid to exit said stimulating well from the non-isolated another zone located at a desired depth into a surrounding geological formation in order to hydraulically produce a fracture or a system of fractures within said formation at said desired depth that will be connected with said existing well to be stimulated,
wherein the stimulating fluid is brine discharged from a geothermal power plant.

15. An apparatus for stimulating a non-commercial geothermal well, comprising
a perforated liner attachable to a casing of a stimulating well drilled within a field containing a geothermal resource and an existing non-commercial well,
a plurality of vertically spaced swell packers mounted to an outer face of said liner, and
a stub-in float collar bonded with an inner face of said liner at a depth of a lowermost swell packer,
wherein each of said plurality of swell packers is swellable when contacted by subterraneously heated geothermal brine present in said stimulating well to isolate a corresponding zone in said stimulating well and is resistant to the temperature of said brine,
wherein stimulating fluid injected into said stimulating well is caused to exit said stimulating well from a non-isolated zone located at a desired depth into a surrounding geological formation in order to hydraulically produce a fracture or a system of fractures within said formation at said desired depth.

16. The apparatus according to claim 15, further comprising a downwardly extending injection tube through which the stimulating fluid is injectable, the injection tube being embedded within the stub-in float collar, the injection tube passing through the stub-in float collar, whereby to urge the stimulating fluid to exit the stimulating well via the perforations of the liner which are located within a toe zone between the lowermost swell packer and a well bottom.

17. The apparatus according to claim 15,
wherein each of the plurality of swell packers comprises a rubber piece that is longitudinally restrained and radially unrestrained, to swell when contacted by the subterraneously heated brine and to thereby seal a radial interspace between a face of the stimulating well and the outer face of the liner.

18. The apparatus according to claim 17, wherein each of the plurality of swell packers is radially swellable to more than twice its size.

* * * * *